Nov. 16, 1948.  O. W. INSKEEP  2,453,916
CASTER MOUNT FOR SINGLE-WHEEL TRAILERS
Filed March 11, 1946
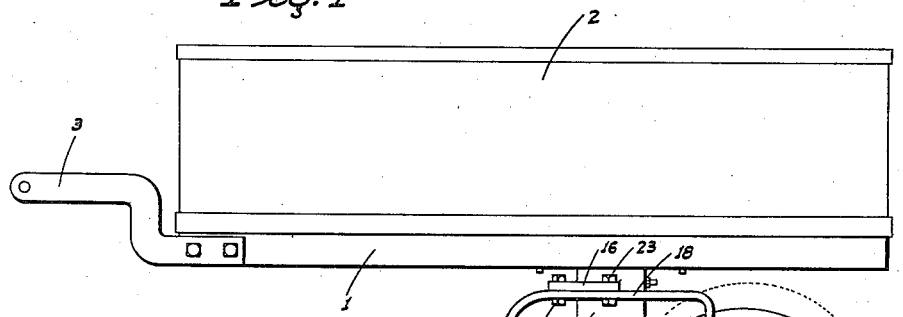
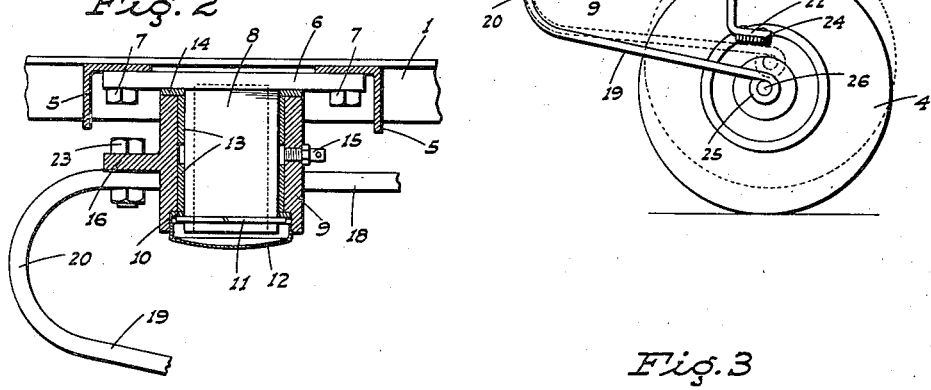
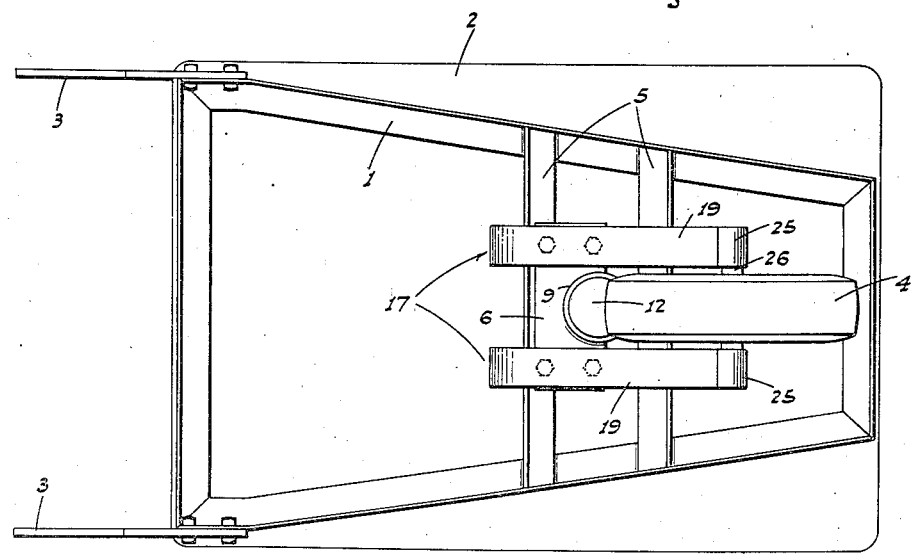
INVENTOR.
Oliver W. Inskeep
BY
ATTYS Patented Nov. 16, 1948

2,453,916

UNITED STATES PATENT OFFICE 2,453,916

CASTER MOUNT FOR SINGLE-WHEEL TRAILERS

Oliver W. Inskeep, Stockton, Calif., assignor to Harris Manufacturing Company, Stockton, Calif., a corporation of California Application March 11, 1946, Serial No. 653,612

9 Claims. (Cl. 16—44)

This invention is directed to, and it is an object to provide, a single-wheel, automobile type utility trailer which includes an improved caster mount for the single supporting wheel of said trailer.

Another object of the invention is to provide a caster mount, as above, which includes a novel spring assembly for the single wheel; said spring assembly being designed to embody a normally operative main spring, and a normally unloaded combination resilient stop and overload spring arranged to cooperate with the main spring under certain working conditions.

A further object of the invention is to provide a spring caster mount, for the purpose described, which is simple, practical, durable, easy riding, and otherwise exceedingly effective.

These objects are accomplished by means of such structure and relative arrangement of parts as will fully appear by a perusal of the following specification and claims.

In the drawings similar characters of reference indicate corresponding parts in the several views;

Figure 1 is a side elevation of the trailer and caster mount for the single wheel.

Figure 2 is an enlarged, fragmentary sectional elevation of the caster mount.

Figure 3 is a bottom plan view of the trailer and caster mount thereon.

Referring now more particularly to the characters of reference on the drawings, the trailer comprises a rigid horizontal frame 1 on which an open-topped rectangular body 2 is mounted; there being a pair of transversely spaced, forwardly projecting attachment brackets 3 on the frame 1 at the front adapted for connection with the rear bumper of an automobile.

The frame 1 is supported from the ground, intermediate the ends of said frame, by a single, pneumatic-tired wheel 4 secured in connection with the frame by means of the following caster mount.

Intermediate the ends the frame 1 includes a pair of parallel cross beams 5 disposed in spaced relation, and a flat adapter plate 6 extends between and is secured to said cross beam 5 by bolts 7; said adapter plate being disposed centrally between the sides of the frame 1. A heavy-duty pivot pin 8 is fixed centrally on the adapter plate 6 and depends therefrom. A sleeve or hub 9 surrounds the pivot pin 8 from end to end thereof in relatively rotatable relation; said hub 9 being maintained on the pivot pin by a retaining washer 10 locked in place by a snap-type retaining ring 11. A dust cap 12 closes the lower end of the hub 9. Anti-friction bearings 13 are disposed between the pivot pin 8 and the hub 9 in vertically spaced relation, while a thrust bearing 14 engages between the upper end of the hub and the adapter plate 6. A grease fitting 15 is mounted on and extends through the hub 9 in position to feed grease to the pivot pin 8 through the bearings 13.

The hub 9 is formed, on opposite sides thereof, with laterally projecting attachment flanges 16 which are disposed, in the normal position of said hub 9, mainly ahead of the vertical axis of the latter.

A pair of vertically disposed, longitudinally extending leaf springs, indicated generally at 17, are mounted on opposite sides of the hub 9 in attachment with the corresponding laterally projecting flanges 16; said leaf springs being constructed and mounted as follows:

Each spring 17 includes a normally substantially horizontal top leaf 18, and a normally rearwardly and downwardly inclined bottom leaf 19 therebelow; with said top and bottom leaves connected, at their forward ends, by a half-loop 20. At its rear end the top leaf 18 is formed with a down-turned leg 21 having a normally rearwardly projecting foot 22 on the lower end of said leg. Each of the springs 17 is formed, as shown, from a single length of flat spring steel. The top leaf 18 of each spring 17 is affixed by bolts 23 to the corresponding laterally projecting attachment flange 16 at a point on said top leaf adjacent the half-loop 20, whereby at least the rear half of the top leaf is free for springing motion.

The foot 22 of each spring 17 is vertically alined above the rear end portion of the bottom leaf 19, and is normally disposed in clearance relation thereto; said foot being fitted, on the bottom thereof, with a resilient stop pad 24.

At their rear ends the bottom leaves 19 of the springs 17 are formed with eyes 25, and a wheel spindle 26 is mounted in connection with and extends between said eyes; the wheel 4 being journaled on said spindle between the springs.

When the trailer is in use with the above described caster mount, the wheel is free to swivel from side to side by reason of the rotary mounting of the hub 9 on the spindle pin 8, whereby the wheel 4 effectively tracks the vehicle to which the trailer is coupled in draft relation. Also, the caster mount permits the wheel to reverse its position for backing of the trailer.

Under a normal load the bottom leaves 19 of the spring assembly alone function as the springing means for the wheel 4. However, when said wheel strikes a bump and bounces, such vertical movement of the wheel is limited by engagement of the bottom leaves 19 with the resilient stop pad 24; the upper leaves 18 rearwardly of the attachment flanges 16 serving also to absorb a portion of the shock.

When the trailer carries more than a normal load the bottom leaves 19 move relatively upward into engagement with the resilient stop pads 24, and in such case the top leaves 18, rearwardly of the attachment flanges 16, serve effectively as overload springs.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A caster mount for a vehicle supporting wheel, comprising a depending support adapted to be secured to a vehicle, a normally longitudinal spring including a top leaf and a vertically spaced bottom leaf connected together at their normally forward ends, means attaching the top leaf to the support, and a wheel journaled in connection with the bottom leaf in normally rearwardly offset relation to the vertical axis of the support; the top leaf including a downturned leg at its normally rear end, a foot on the leg, and a shock absorbing pad on the bottom of the foot in adjacent but normally spaced relation above the bottom leaf.

2. A caster mount, as in claim 1, in which the top leaf is attached adjacent its forward end to the support.

3. A caster mount, as in claim 1, in which the top leaf is attached adjacent its forward end to the support, mainly ahead of said axis of the support.

4. A caster mount for a vehicle-supporting wheel, comprising a depending support adapted to be secured to a vehicle, a pair of transversely spaced, normally longitudinal leaf springs disposed on opposite sides of the support, each spring comprising a top leaf and a bottom leaf therebelow, the leaves of each spring being connected at their forward ends, means attaching the top leaves to the support, a wheel spindle connecting the bottom leaves in offset relation to the axis of the support, and a wheel journaled on the wheel spindle; the top leaves being attached adjacent their normally forward ends to the support, a downturned leg on the normally rear end of each top leaf, a foot on the lower end of each leg, and a shock absorbing pad on the bottom of each foot disposed adjacent but above the corresponding bottom leaf.

5. A caster mount as in claim 4 in which each spring is formed from a single length of flat spring steel.

6. A caster mount for a vehicle-supporting wheel, comprising a depending support adapted to be secured to a vehicle, a pair of transversely spaced, normally longitudinal leaf springs disposed on opposite sides of the support, each spring comprising a top leaf and a bottom leaf therebelow, the leaves of each spring being connected at their forward ends, means attaching the top leaves to the support, a wheel spindle connecting the bottom leaves in offset relation to the vertical axis of the support, and a wheel journaled on the wheel spindle; the top leaves being attached adjacent their normally forward ends to the support at a point ahead of the vertical axis of the support, a downturned leg on the normally rear end of each top leaf, a foot on the lower end of each leg, and a shock absorbing pad on the bottom of each foot disposed adjacent but above the corresponding bottom leaf.

7. A caster mount for a vehicle-supporting wheel, comprising a depending support adapted to be secured to a vehicle, a pair of transversely spaced, normally longitudinal leaf springs disposed on opposite sides of the support, each spring comprising a top leaf and a bottom leaf therebelow, the leaves of each spring being connected at their forward ends by an integral curved portion, laterally projecting flanges on opposite sides of the support, the top leaves of corresponding springs being attached to said flanges adjacent the forward ends of said top leaves, a wheel spindle connecting the bottom leaves in normally rearwardly offset relation to the vertical axis of the support, and a wheel journaled on the wheel spindle between the springs.

8. A caster mount for a vehicle-supporting wheel, comprising a depending support adapted to be secured to a vehicle, a pair of transversely spaced, normally longitudinal leaf springs disposed on opposite sides of the support, each spring comprising a top leaf and a bottom leaf therebelow, the leaves of each spring being connected at their forward ends by an integral curved portion, laterally projecting flanges on opposite sides of the support, the top leaves of corresponding springs being attached to said flanges adjacent the forward ends of said top leaves, a wheel spindle connecting the bottom leaves in normally rearwardly offset relation to the vertical axis of the support, and a wheel journaled on the wheel spindle between the springs, a downturned leg on the normally rear end of each top leaf, a foot on the lower end of each leg, and a shock absorbing pad on the bottom of each foot disposed adjacent but above the corresponding bottom leaf.

9. A caster mount for a vehicle supporting wheel comprising a support adapted to be secured to the vehicle, a spring comprising two vertically spaced apart leaves integrally connected together at one end and being disconnected at their opposite ends, the upper leaf being secured intermediate its ends to the support, a depending leg on the free end of the upper leaf, a foot on such leg normally lying in substantially vertical alinement with the free end of the lower leaf, and a wheel supported by the free end of said lower leaf.

OLIVER W. INSKEEP.

REFERENCES CITED

The following references are of record in the file of this patent:

UNITED STATES PATENTS

| Number | Name | Date |
|---|---|---|
| Re. 18,467 | Deisler | May 17, 1932 |
| 239,330 | Hunt | Mar. 29, 1881 |
| 427,655 | Arnold | May 13, 1890 |
| 1,958,905 | Anderson | May 15, 1934 |
| 2,256,038 | Woodruff | Sept. 16, 1941 |
| 2,271,304 | Mulholland | Jan. 27, 1942 |

FOREIGN PATENTS

| Number | Country | Date |
|---|---|---|
| 450,893 | Great Britain | July 27, 1936 |